(12) United States Patent
Nelson (10) Patent No.: US 7,887,618 B2
(45) Date of Patent: Feb. 15, 2011

(54) METHODS AND SORBENTS FOR UTILIZING A HOT-SIDE ELECTROSTATIC PRECIPITATOR FOR REMOVAL OF MERCURY FROM COMBUSTION GASES

(75) Inventor: Sidney Nelson, Hudson, OH (US)

(73) Assignee: Albemarle Corporation, Baton Rouge, LA (US)

( * ) Notice: Subject to any disclaimer, the term of this patent is extended or adjusted under 35 U.S.C. 154(b) by 29 days.

(21) Appl. No.: 12/424,186

(22) Filed: Apr. 15, 2009

(65) Prior Publication Data

US 2009/0272267 A1 Nov. 5, 2009

Related U.S. Application Data

(60) Provisional application No. 61/044,980, filed on Apr. 15, 2008.

(51) Int. Cl.
*B03C 3/013* (2006.01)
(52) U.S. Cl. .................. 95/58; 95/76; 95/134
(58) Field of Classification Search .............. 95/58, 95/76, 134; 96/27, 32, 52
See application file for complete search history.

(56) References Cited

U.S. PATENT DOCUMENTS

| | | | | |
|---|---|---|---|---|
| 5,505,766 A | * | 4/1996 | Chang | 95/134 |
| 6,001,152 A | * | 12/1999 | Sinha | 95/58 |
| 6,152,988 A | * | 11/2000 | Plaks et al. | 95/58 |
| 6,488,740 B1 | * | 12/2002 | Patel et al. | 95/71 |
| 6,521,021 B1 | * | 2/2003 | Pennline et al. | 95/134 |
| 6,953,494 B2 | | 10/2005 | Nelson, Jr. | |
| 7,048,779 B1 | * | 5/2006 | Weyand et al. | 95/58 |
| 7,141,091 B2 | * | 11/2006 | Chang | 95/58 |
| 7,361,209 B1 | * | 4/2008 | Durham et al. | 95/107 |
| 7,731,781 B2 | * | 6/2010 | Berry et al. | 95/116 |
| 2009/0056538 A1 | * | 3/2009 | Srinivasachar et al. | 95/58 |
| 2010/0031818 A1 | * | 2/2010 | Higgins et al. | 95/58 |

* cited by examiner

*Primary Examiner*—Richard L Chiesa
(74) *Attorney, Agent, or Firm*—Marcy M. Hoefling; Jeremy J. Kliebert; James A. Jubinsky (57) ABSTRACT

Methods are provided for reducing emission of mercury from a gas stream by treating the gas with carbonaceous mercury sorbent particles to reduce the mercury content of the gas; collecting the carbonaceous mercury sorbent particles on collection plates of a hot-side ESP; periodically rapping the collection plates to release a substantial portion of the collected carbonaceous mercury sorbent particles into hoppers; and periodically emptying the hoppers, wherein such rapping and emptying are done at rates such that less than 70% of mercury adsorbed onto the mercury sorbent desorbs from the collected mercury sorbent into the gas stream.

9 Claims, 12 Drawing Sheets

FIG. 1

| Unscrubbed Hot-Side ESPs in ICR | | Hg (ug/Nm3) | | |
|---|---|---|---|---|
| (Each plant averaged 3 Ontario Hydro triplicates) | | Hg (p) | Hg (+2) | Hg (0) |
| Bituminous coals | Into ESP | 0.7 | 3.7 | 2.8 |
| Average of 3 plants | Out Stack | 0.3 | 3.7 | 2.5 |
| Subbituminous coals | Into ESP | 0.1 | 2.3 | 10.7 |
| Average of 5 plants | Out Stack | 0.1 | 2.3 | 9.2 |

METHODS AND SORBENTS FOR UTILIZING A HOT-SIDE ELECTROSTATIC PRECIPITATOR FOR REMOVAL OF MERCURY FROM COMBUSTION GASES

STATEMENT REGARDING FEDERALLY SUPPORTED RESEARCH OR DEVELOPMENT

The United States Government may own certain rights to the present invention pursuant to Department of Energy Contract No. DE-FC26-03NT41990 with Sorbent Technologies Corporation.

BACKGROUND

This invention relates to the removal of mercury from combustion gas streams and more specifically to the use of chemically-treated carbonaceous materials to reduce the emissions of mercury from coal-fired power plants that utilize a hot-side electrostatic precipitator (ESP) to control particulate emissions.

It is well known that mercury is both hazardous and poisonous. Consequently, there is frequently a need to remove it from air streams around industrial processes, such as at chlor-alkali plants, or from the air in dental offices using amalgams, where people may be directly exposed to mercury vapor. Similarly, there is a need to sequester mercury from natural gas and hydrocarbon streams, where it corrodes processing equipment; from wastewater streams, where its discharge can contaminate ecosystems; and from the hot combustion-gas emissions of waste incinerators, where its emission to the environment can methylate and bio-concentrate up the food chain. Each of these gas or liquid streams has different characteristics that make some mercury removal methods effective and appropriate, but makes others ineffective and inappropriate. Consequently, over the years, a multitude of different approaches have been developed for effectively removing mercury species from various streams. These overall approaches include, among others: liquid scrubbing technologies, homogenous gas-phase technologies, metal amalgamation techniques, and processes utilizing various sorbent materials in different application schemes, with sorbents optionally impregnated or reacted with various chemical promoters.

In the past, activated carbons have demonstrated utility for sequestering mercury vapors in some applications. When combined with halogen compounds, the mercury sequestration performance of activated carbons can be improved. In particular, the ability of iodine and iodide impregnations to increase the capacity of granular activated carbons in capturing elemental mercury vapor from air at ambient temperatures has long been known. More recently, bromine-treated activated carbons have shown great efficacy in mercury capture when injected into flue gases as described in U.S. Pat. No. 6,953,494, the disclosure of which is incorporated by reference herein.

A common recent concern is the mercury emitted from coal-fired power plants. It has been estimated, for example, that about 100,000 pounds of mercury are being emitted into the atmosphere annually in the United States from coal-fired power plants. Capturing and isolating this mercury is a very difficult technical problem because the gas volumes to be processed are great, the concentrations of the mercury in the gas are relatively low, and the gas temperatures are high. Also, many other complicating compounds are present in the flue gas and multiple mercury species have to be sequestered.

Hot-Side ESPs have been used in many applications where the resistivity of the fly ash or dust make it difficult to collect in a cold-side ESP. About 10% of the U.S. utility boilers are of the hot-side design. Hot-side ESPs operate at temperatures typically between 230° C. and 455° C. (450° F. and 850° F.), as compared to the typical cold-side ESP operating temperature of 120° C. and 205° C. (250° F. to 400° F.). The hot-side ESP gets its name from the fact that the control device is positioned before the air preheater, which is the hot side of the air preheater. The operation of the ESP at elevated temperatures tends to reduce the ash resistivity and make it easier to capture.

The unburned carbon in fly ash loses most of its mercury removal capacity above 230° C. (450° F.). Thus, there is very little native mercury removal by the unburned carbon in hot-side ESPs. Similarly, plain powdered activated carbon (PAC) has little to no mercury removal capacity above these temperatures and, therefore, has little to no value in mercury control in these applications.

Thus, there is a need for new means for effectively and economically controlling utility mercury emissions, particularly for use in a hot side ESP.

THE INVENTION

This invention meets the above-described needs by providing methods comprising: (a) injecting a plurality of carbonaceous mercury sorbent particles into a combustion gas stream such that at least a portion of any mercury or mercury-containing compounds in the gas stream are adsorbed onto at least a portion of the carbonaceous mercury sorbent particles; (b) collecting a portion of the carbonaceous mercury sorbent particles from the combustion gas stream on at least one collection plate of a hot-side electrostatic precipitator while the combustion gas stream passes through the hot-side electrostatic precipitator at least about 230° C.; (c) periodically rapping the at least one collection plate to release a substantial portion of the collected carbonaceous mercury sorbent particles into at least one hopper; and (d) periodically emptying the at least one hopper; wherein the rapping and emptying are conducted at rates such that less than about 70% of the mercury adsorbed onto the collected carbonaceous mercury sorbent particles desorbs and reenters the combustion gas stream. Also provided are such methods wherein the carbonaceous mercury sorbent particles comprise carbonaceous substrates; and wherein the carbonaceous substrates comprise activated carbons produced from anthracite, bituminous coal, lignite, coconut shell, wood or wood waste; and wherein at least a portion of said carbonaceous mercury sorbent particles have been formed by treatment of a carbonaceous substrate with a chemical substance; and wherein the chemical substance comprises a halogen or a halogen-containing compound; and wherein the chemical substance comprises sulfur or a sulfur-containing compound; and wherein the halogen comprises elemental bromine gas; and wherein halogen-containing compound comprises a bromine-containing salt. Also provided are such methods wherein (a) is replaced by: (a) injecting a plurality of carbonaceous mercury sorbent particles into a combustion gas stream that is derived from a combustion fuel and combustion air, and adding a chemical substance to the combustion gas stream and/or to the combustion fuel and/or to the combustion air, such that at least a portion of any mercury or mercury-containing compounds in the gas stream are adsorbed onto at least a portion of the carbonaceous mercury sorbent particles, wherein said chemical substance is useful for increasing the mercury-adsorbing capability of the carbonaceous substrate.

Also provided by this invention are methods comprising: (a) injecting a plurality of carbonaceous mercury sorbent particles into a combustion gas stream such that at least a portion of any mercury or mercury-containing compounds in the gas stream are adsorbed onto at least a portion of the carbonaceous mercury sorbent particles, wherein at least a portion of said carbonaceous mercury sorbent particles have been formed by treatment of a carbonaceous substrate with a bromine or a bromine-containing compound; (b) collecting a portion of the carbonaceous mercury sorbent particles from the combustion gas stream on at least one collection plate of a hot-side electrostatic precipitator while the combustion gas stream passes through the hot-side electrostatic precipitator at least about 230° C.; (c) periodically rapping the at least one collection plate to release a substantial portion of the collected carbonaceous mercury sorbent particles into at least one hopper and emptying the at least one hopper at a sufficient rate such that less than about 70% of the mercury adsorbed onto the collected carbonaceous mercury sorbent particles desorbs and reenters the combustion gas stream. Further provided are methods for removing mercury and mercury-containing compounds from a combustion gas in an exhaust gas system with a hot-side electrostatic precipitator, comprising the steps of: providing a carbonaceous substrate that has been derived from anthracite or bituminous coal; treating the carbonaceous substrate with an effective amount of bromine or bromine containing salt for a sufficient time to increase the ability of the carbonaceous substrate to adsorb mercury and mercury-containing compounds; injecting the mercury sorbent into a stream of the mercury-containing combustion gas for a sufficient time to allow an effective amount of the mercury and mercury-containing compounds in the combustion gas to attach onto the mercury sorbent; electrostatically separating the mercury sorbent from the combustion gas stream on the collection plates of a hot-side electrostatic precipitator at a temperature of 230° C. (450° F.) or higher; periodically rapping the collection plates to release the mercury-containing sorbents into hoppers below; and emptying the hoppers at a sufficient rate to prevent the majority of the captured mercury from evolving from the mercury sorbents and reentering the combustion gas stream.

FIGURES

The invention will be better understood by reference to the Figures in which.

CARBONACEOUS MERCURY SORBENT

Suitable carbonaceous mercury sorbent particles used in methods according to this invention comprise one or more carbonaceous substrates capable of adsorbing mercury and mercury-containing compounds. Suitable carbonaceous substrates can comprise activated carbons produced from anthracite, bituminous coal, lignite, coconut shell, wood or wood waste, or the like.

Carbonaceous mercury sorbent particles used in methods according to this invention can be formed by treatment of a carbonaceous substrate with at least a chemical substance. Suitable chemical substances include a halogen such as bromine, chlorine or iodine, and the like; a halogen-containing compound such as a bromine-containing compound, and the like; sulfur or a sulfur-containing compound; or other chemical substances useful for increasing the mercury-adsorbing capability of the carbonaceous substrate. Suitable bromine or bromine-containing compounds can comprise elemental bromine, elemental bromine gas, hydrogen bromide, a bromine-containing salt, a dissolved bromine salt, a heated bromine salt, and the like. Means for treating a carbonaceous substrate with a chemical substance such as a halogen or a halogen-containing compound or sulfur or a sulfur-containing compound are well known to those skilled in the art. Also anticipated by this invention are methods wherein carbonaceous mercury sorbent particles are injected into a combustion gas stream and a chemical substance as described herein is also added to the fuel being burned to generate the combustion gas stream and/or added to the fuel's supporting combustion air and/or injected into the combustion gas stream.

Gas Stream

A gas stream treated according to this invention can be a combustion gas stream, e.g., from a coal-fired power plant. Suitable combustion gas streams for treatment according to this invention comprise mercury or mercury-containing compounds. For examples, a combustion gas stream treated according to this invention can be derived from a combustion fuel, such as coal or any other combustion fuel, and combustion air.

Hot-Side ESP/Collection Plates/Hopper

Figure 1:
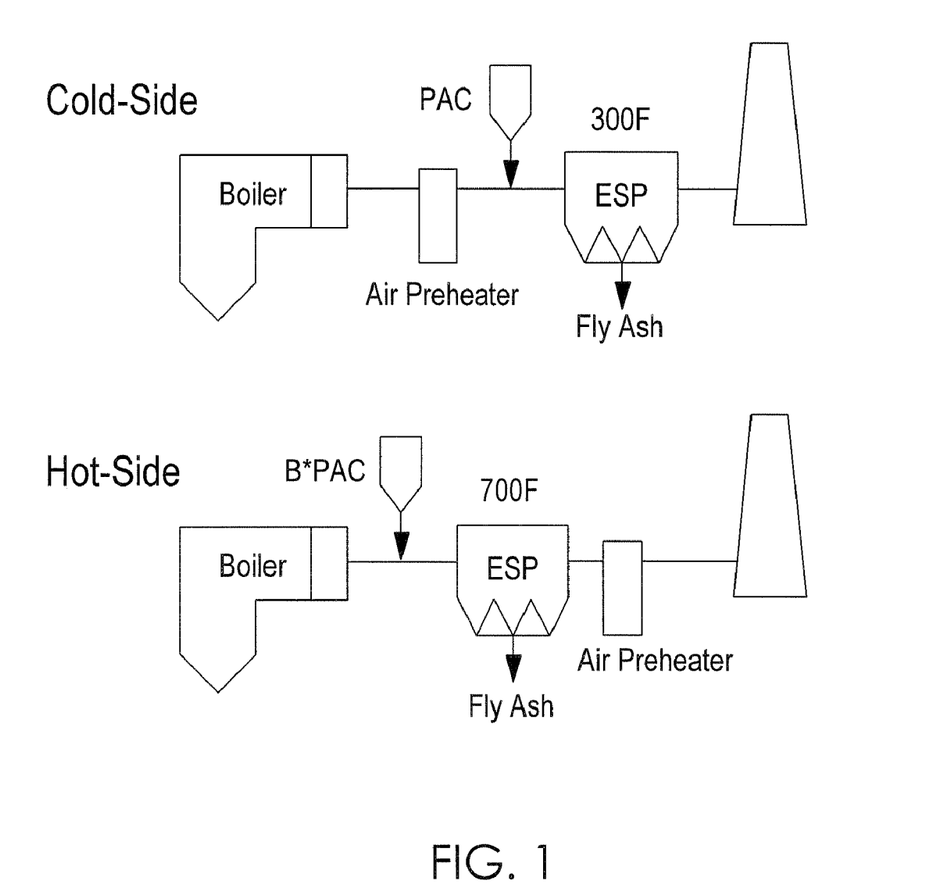
FIG. 1 includes schematic diagrams of exhaust gas systems distinguishing between those with cold-side electrostatic precipitators and those with hot-side electrostatic precipitators.

Hot-side electrostatic precipitators (ESPs), and the use thereof to control particulate emissions from a gas stream, such as a combustion gas stream, are known to those skilled in the art. FIG. 1 illustrates how a hot-side ESP is located on the hot side of an air preheater in a process stream. Not illustrated in FIG. 1, but well-known to those skilled in the art, an ESP comprises at least one charging electrode, typically a plurality of charging electrodes, at least one collection plate, typically a plurality of collection plates, and at least one hopper. An ESP collection plate is designed to, and does, collect particles from a gas stream that have been charged by an electrode, e.g., by electrostatically collecting the particles. An ESP hopper is designed to, and does, contain particles that are released from at least one collection plate as it is rapped such that collected particles are released. An ESP hopper is periodically emptied by means familiar to those skilled in the art so that contained particles are less likely to reenter the gas stream that is being passed through the ESP.

It is an aspect of the present invention to provide methods of utilizing a sorbent material, e.g., carbonaceous mercury sorbent particles, whereby the sorbent material is injected into a hot mercury-containing combustion gas such that a portion of the mercury is adsorbed onto the sorbent and removed from the combustion gas with the combustion fly ash in a hot-side ESP. Methods of this invention can be used to remove a substantial portion of mercury and mercury-containing compounds from a combustion gas. By substantial portion is meant at least about 30%.

It is also an aspect of the present invention to provide a mercury sorbent material that causes the adsorbed gas-phase mercury to become essentially permanently-sequestered from future interactions with the environment.

It is also an aspect of the present invention to operate the ESP and the fly ash collection system in a manner that maximizes mercury reduction performance.

These and other aspects of the invention are achieved by a methods according to this invention for removing mercury and mercury-containing compounds from a combustion gas in a combustion gas system utilizing a hot-side ESP. Methods of this invention can have the aspects of providing a mercury sorbent, such as mercury sorbent particles that have been derived from treated carbonaceous substrates such as activated carbons derived from anthracite, bituminous coal, lignite, coconut shell, or wood or wood wastes, or the like; injecting the mercury sorbent into a stream of the mercury-containing combustion gas for a sufficient time to allow at least an effective amount of the mercury and mercury-containing compounds in the combustion gas to adsorb onto the mercury sorbent and collecting and removing the mercury sorbent from the combustion gas stream in a hot-side ESP. The mercury sorbent can be prepared by treating a carbonaceous substrate with an effective amount of bromine or a dissolved or volatilized bromine salt for a sufficient time to increase the ability of the carbonaceous substrate to adsorb mercury and mercury-containing compounds at temperatures above those found in cold-side ESPs. The sorbent is separated from the gas stream in a hot-side ESP at a temperature above 230° C. (450° F.) and the time spent in the hot-side ESP and its fly ash collection hoppers is minimized to prevent the release and reemission of the captured mercury back into the flue gas stream.

In an example process of this invention, a carbonaceous sorbent, such as powdered activated carbon (PAC), that has previously been chemically treated as described herein, is injection into a hot, flowing gas stream of combustion products to capture and concentrate vaporous mercury species from the gas stream. Conditions exist such that the adsorbent material that is injected into the flowing gas, intimately mixes with the gas, and is separated from the gas in a hot-side electrostatic precipitator (ESP). The hot-side ESP is operated in such a manner that the collected fly ash is removed quickly from the ESP plates and hoppers to allow little time for the release of the captured mercury back into the gas stream.

In coal-fired power plants, hot-side ESPs remove fly ash and any injected mercury sorbent ahead of air preheaters, where temperatures are typically about 370° C. (700° F.). Cold-side ESPs, on the other hand, operate after the air preheater, where gas temperatures are typically about 150° C. (300° F.). See FIG. 1.

Surprisingly, it has been discovered that chemically treated carbonaceous materials, e.g., halogenated activated carbon materials, preferably powdered activated carbons that has been exposed to bromine, have the ability to remove a high degree of mercury species in hot-side electrostatic precipitators if the appropriate base carbon is used and the hot-side ESP is operated in a manner to rapidly remove the captured fly ash from the system.

Figure 2:
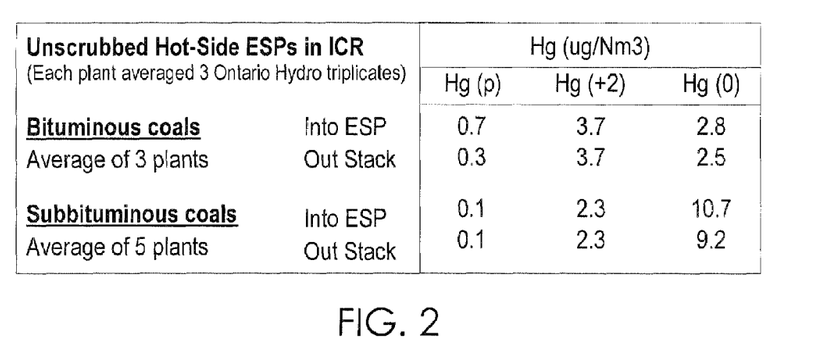
FIG. 2 is a chart averaging the natural native mercury-removal performance at eight different hot-side ESPs at coal-fired power plants.
Figure 3:
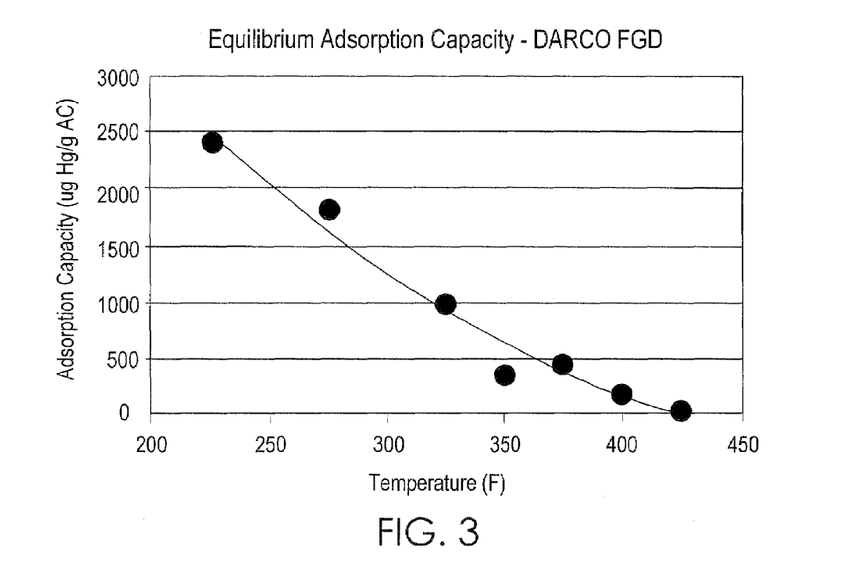
FIG. 3 is a plot of laboratory fixed-bed data indicating the temperature dependence of plain powdered activated carbon (PAC)

Hot-side ESPs do not typically remove any mercury by themselves. See in FIG. 2 the average inlet and outlet mercury concentration measurements from eight hot-side ESPs sampled in response to the U.S. Environmental Protection Agency's 1999 Information Collection Request (ICR). The average flue gas concentrations of elemental mercury (0), oxidized mercury (+2), and particulate-associated mercury (p) leaving the hot-side ESPs at both bituminous and subbituminous coal burning plants were essentially the same as the mercury concentrations entering. Moreover, the injection of plain powdered activated carbons will sequester little to no mercury vapor at temperatures above 230° C. (450° F.), where hot-side ESPs operate. See FIG. 3, derived from a presentation from Michael Durham entitled "Results from Four Full-Scale Field Tests of ACI for Control of Mercury Emissions", presented to the U.S. Environmental Protection Agency's Utility MACT Working Group, Washington, D.C., Mar. 4, 2003.

In field testing with brominated mercury sorbents, it was discovered that there was an unsuspected variable. This variable was the operation of the hot-side ESP. Allowing the mercury sorbent to reside at a high temperature and/or in a large volume in the hot-side ESP for an extended period of time caused a significant amount of the captured mercury to be re-emitted. This issue could be overcome by operating the ESP in the manner to minimize the time the ash was held at high temperature or in volumes which allow heat generated by carbon oxidation to build up and cause the re-emission of the captured mercury back into the flue gas stream and out the smokestack.

EXAMPLES

The following examples are illustrative of the principles of this invention. It is understood that this invention is not limited to any one specific embodiment exemplified herein, whether in the examples or the remainder of this patent application. Example 1 is a comparative example.

Example 1

Comparative Example

This first full-scale mercury sorbent injection test was conducted at 365° C. (690° F.). In this test, shown in FIG. 4, flue-gas mercury concentrations at the outlet of the hot-side ESP were very close to those at the inlet, indicating little to no mercury removal. The mercury emissions dropped immediately upon the injection of a brominated PAC derived from bituminous coal (10:00), but the emissions recovered very quickly to near the starting mercury level. Increasing the sorbent injection rate (12:00) improved the mercury removal momentarily, but again the emissions quickly recovered to their original level.

Figure 4:
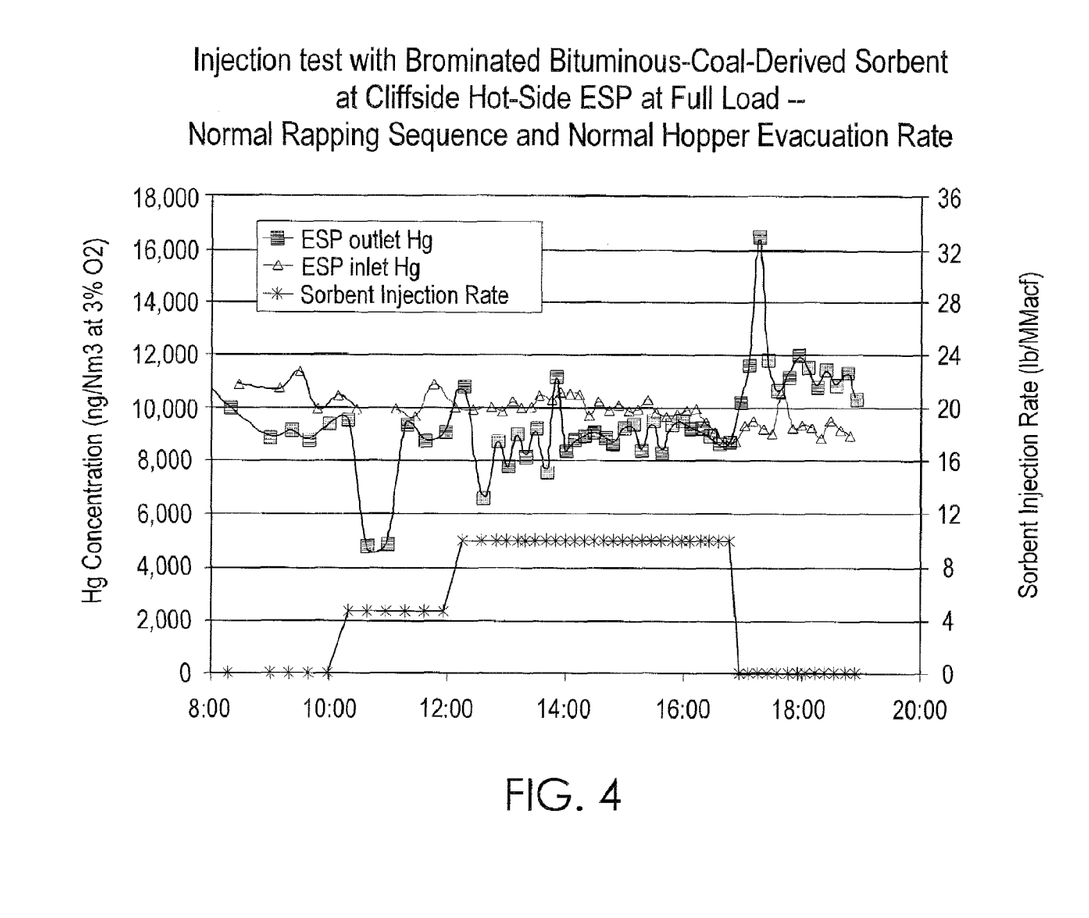
FIG. 4 is a plot of stack mercury emissions over time and the injection rate of brominated PAC into a hot-side ESP operating at 365° C. (690° F.) with normal rapping sequence and normal hopper evacuation rate.

When the sorbent was turned off (17:00), the outlet mercury concentration surprisingly spiked, with significantly more mercury leaving the ESP for a period than entering. Then the inlet and outlet levels stabilized and again matched. Overall, the net areas under the inlet and outlet curves were the same. Interestingly, from this odd behavior it can be interpreted that the sorbents were indeed capturing some of the mercury at these very high temperatures, but were then desorbing this mercury only a short while later. This desorption could be due to a slightly-delayed oxidation (burning) of the carbon surface at the hot-side temperatures or to the chemical replacement over time of the mercury with another flue gas component, for example. Such behavior had not been observed in the art previously. The result was that despite the use of the sorbents and their initial capture of some portion of the mercury, no net mercury reduction was occurring and the full mercury load was ultimately emitted up the smokestack.

Example 2

Figure 5:
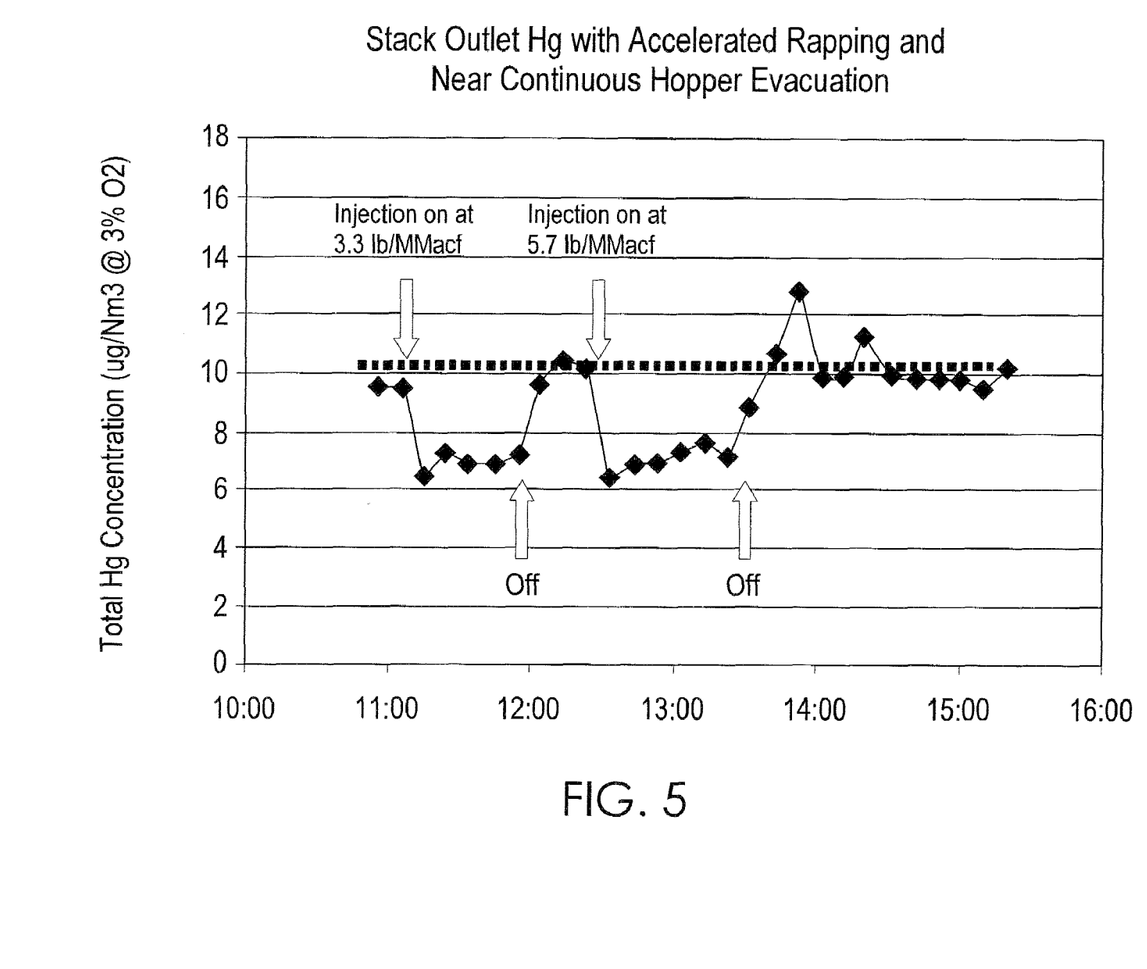
FIG. 5 is a plot of the stack mercury emissions during the injection of brominated PAC into a hot-side ESP operating at 365° C. (690° F.) with accelerated rapping and continuous hopper evacuation.

The invention was then demonstrated on the same hot-side ESP at essentially the same high temperatures with the same carbonaceous mercury sorbents at similar or lower injection rates. See FIG. 5. By minimizing mercury re-emission, net mercury reductions with a hot-side ESP were achieved.

To solve the newly-identified mercury re-emission problem with hot-side ESPs, the operation of the ESP was modified to minimize the time that the sorbent remained at elevated temperature and exposed to flue gas. This was done by increasing the plate rapping rate to the maximum permitted, in order to remove the captured sorbent more rapidly from the ESP collection plates, and by running the fly-ash-removal system continuously in order to pull the fly ash containing the sorbent from the high temperature environment in the ESP hoppers as quickly as possible. As described in FIG. 5, the brominated PAC injection was turned on at 11:00, and off at 12:00, then on again at 12:30, and off again at 13:30. This time, during the entire sorbent injection periods, net mercury reduction was observed. The two operating changes, the increased rapping frequency and allowing minimal sorbent residence time and ash volumes in the hoppers, allowed the brominated mercury sorbent to controllably achieve about a 30% net mercury emission reduction during injection at essentially the same temperature and injection rates as in the Comparative Example 1, where previously no net mercury reduction was observed at all. Either or both of these practices assisted in achieving net mercury reductions. If the sorbent had originally adsorbed up to 100% of the flue gas mercury, and minimization of the post-adsorption residence time in the hot-side ESP and its hoppers restricted re-emission of the captured mercury to less than 70%, then such a net mercury reduction of about 30% would have been observed.

Example 3

Figure 6:
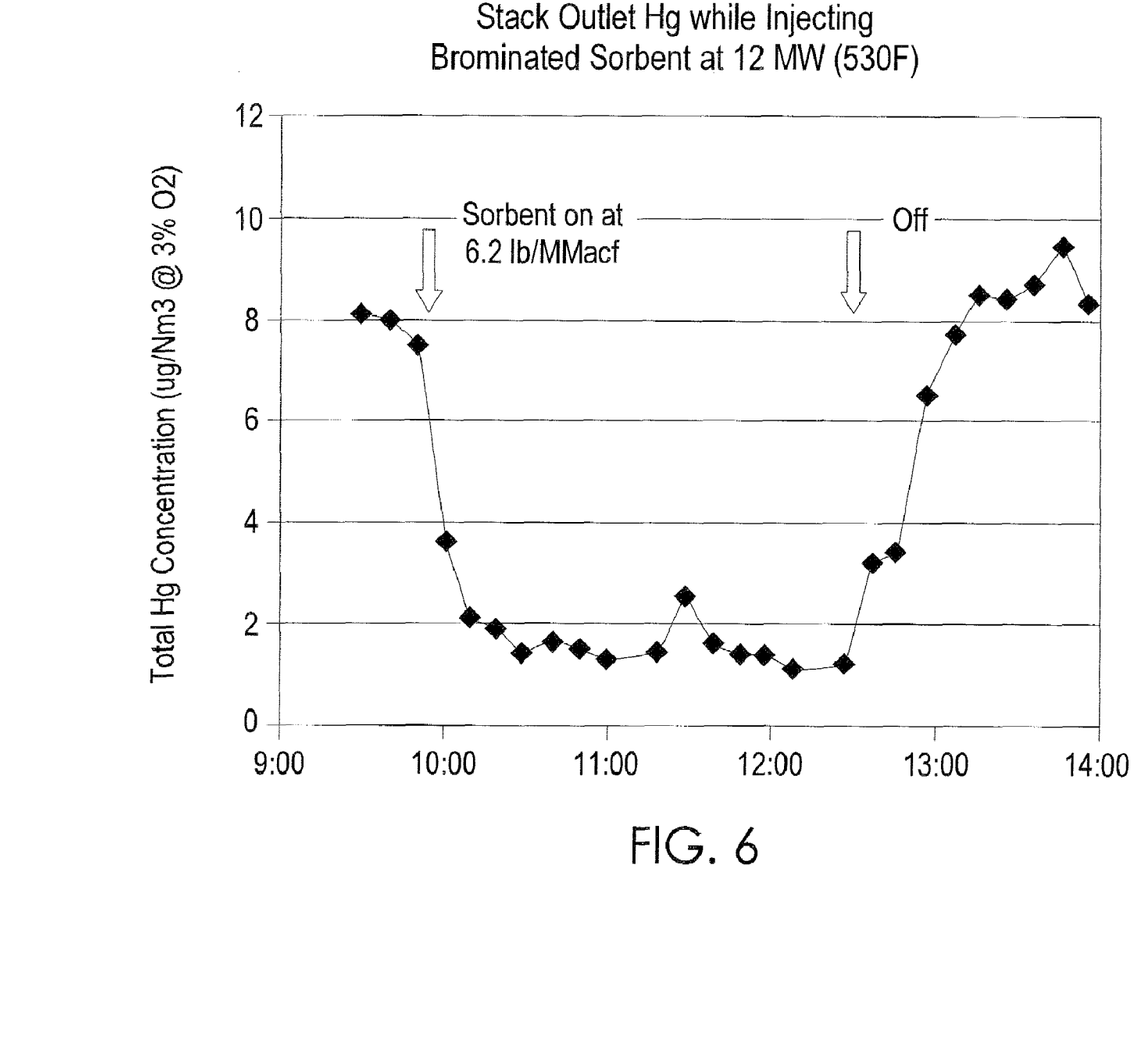
FIG. 6 is a plot of stack mercury emissions during the injection of brominated PAC into a hot-side ESP operating at 280° C. (530° F.), indicating the improvement in mercury capture with the invention.
Figure 7:
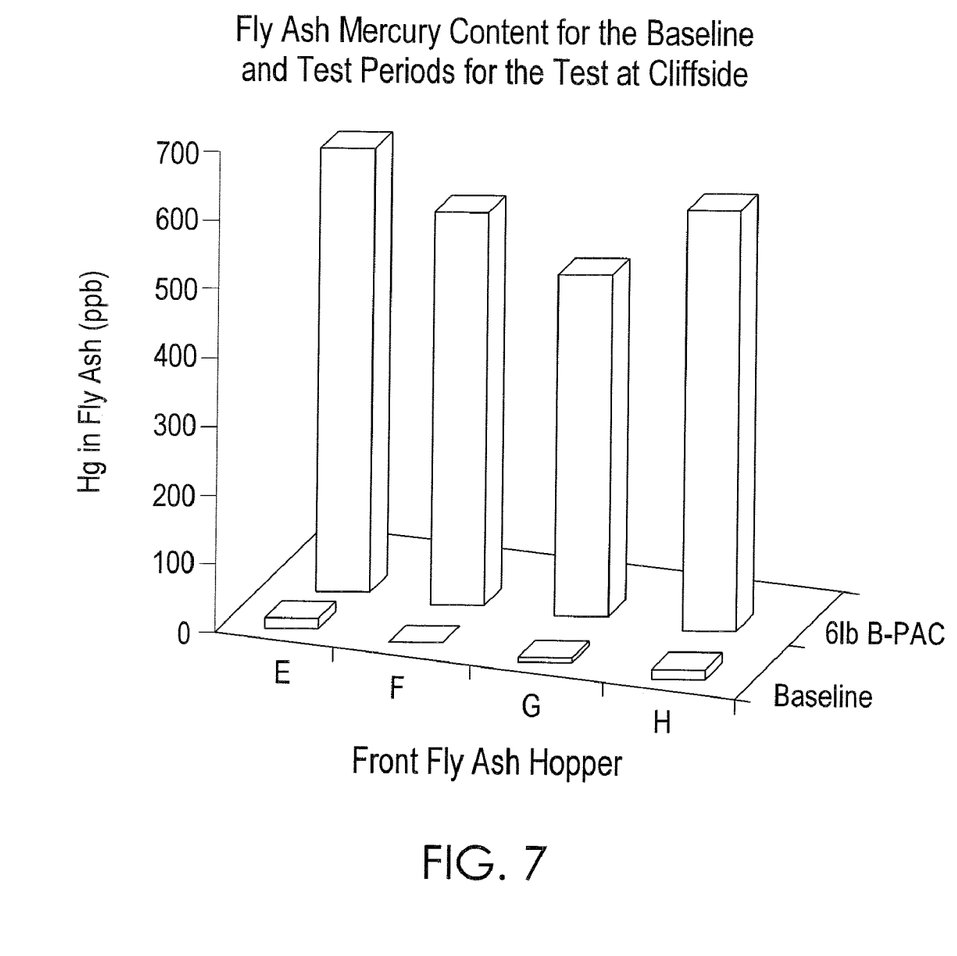
FIG. 7 is a graph of the fly ash mercury content from the baseline and test period during the injection of a brominated PAC.

Tests were also conducted with minimized sorbent residence times at somewhat lower ESP operating temperatures. As illustrated in FIG. 6, in a hot-side ESP at 280° C. (530° F.) a mercury removal rate of 80% in the stack outlet Hg was achieved. A proof of successful capture of mercury is to find the mercury in the fly ash. The mercury content of the baseline fly ash prior to sorbent injection was nearly zero. The mercury content of the fly ash from the test run with sorbent injection at 6 pounds-per-million-actual-cubic feet-of-flue-gas (lb/MMacf) was several hundred parts per billion, supporting the measured mercury removal rate. See FIG. 7.

Example 4

Figure 8:
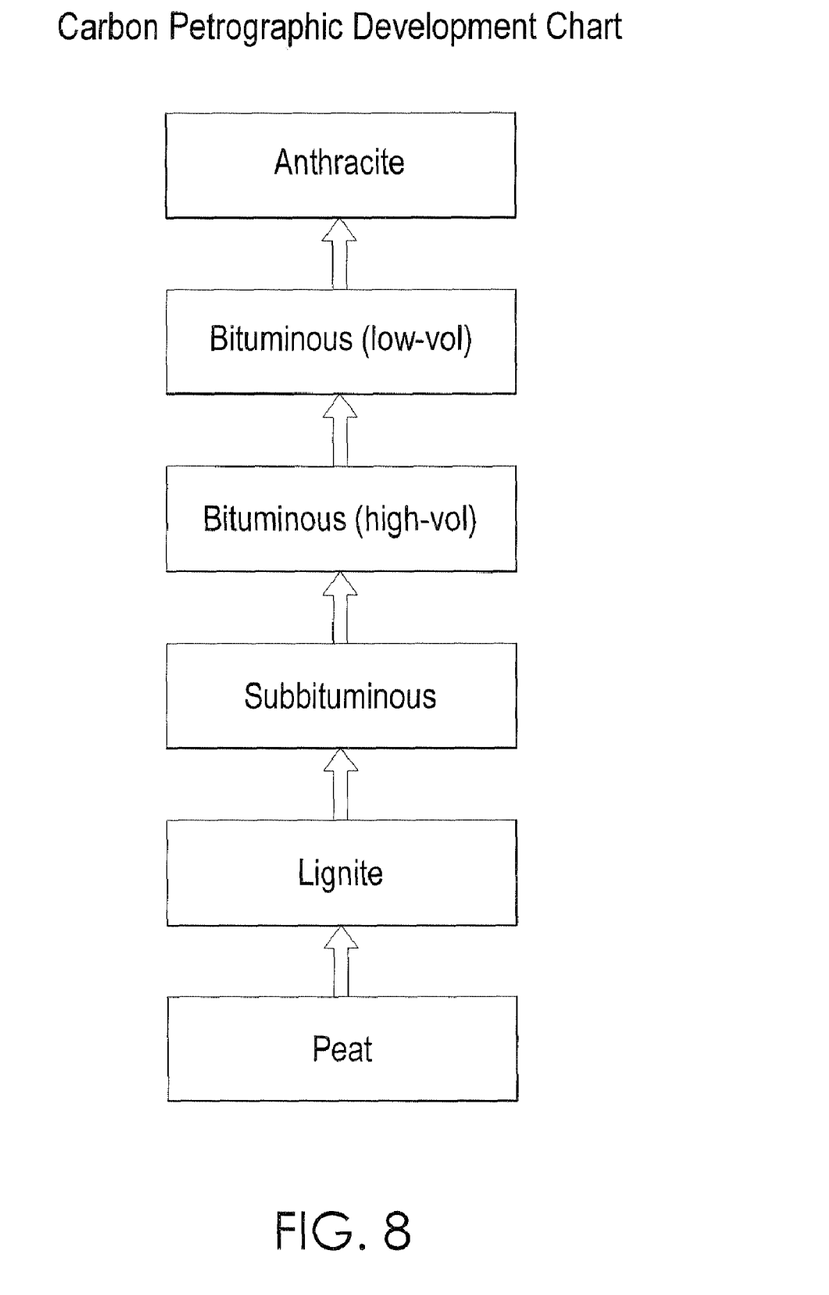
FIG. 8 is a graph of the petrology of carbon as it is refined from living vegetation into more ordered carbon forms such as coal.
Figure 9:
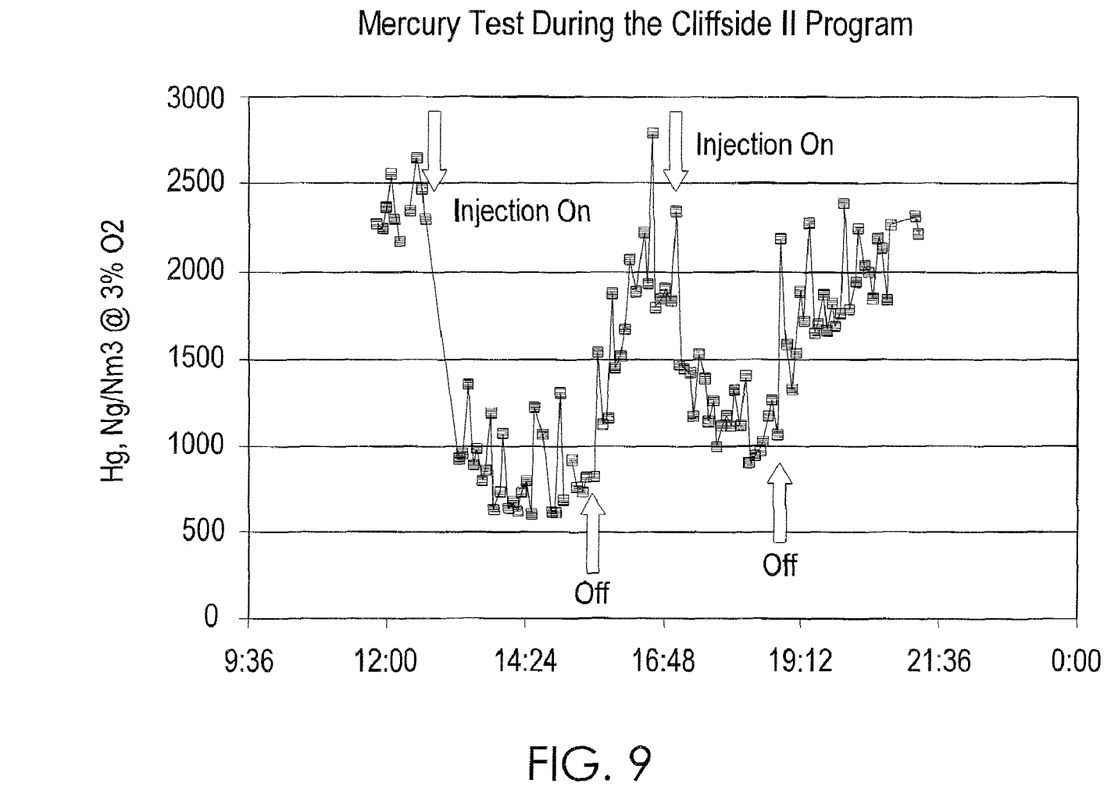
FIG. 9 is a graph of stack mercury emissions during the injection of brominated PAC into a hot-side ESP operating at 305° C. (580° F.) and 325° C. (615° F.)

Improvements in manufacturing the brominated mercury sorbent were made and testing was again conducted at the prior power plant. The higher rank carbon forms such as bituminous coal and anthracite (FIG. 8) produced PACs that appeared to be less affected by temperature. During this test, the temperature range of the brominated sorbent was extended and the performance improved. See FIG. 9. Here the sorbent injection was initiated at 12:30 and stopped at 15:30, then turned on again at 17:00 and off again at 18:30.

Example 5

Figure 10:
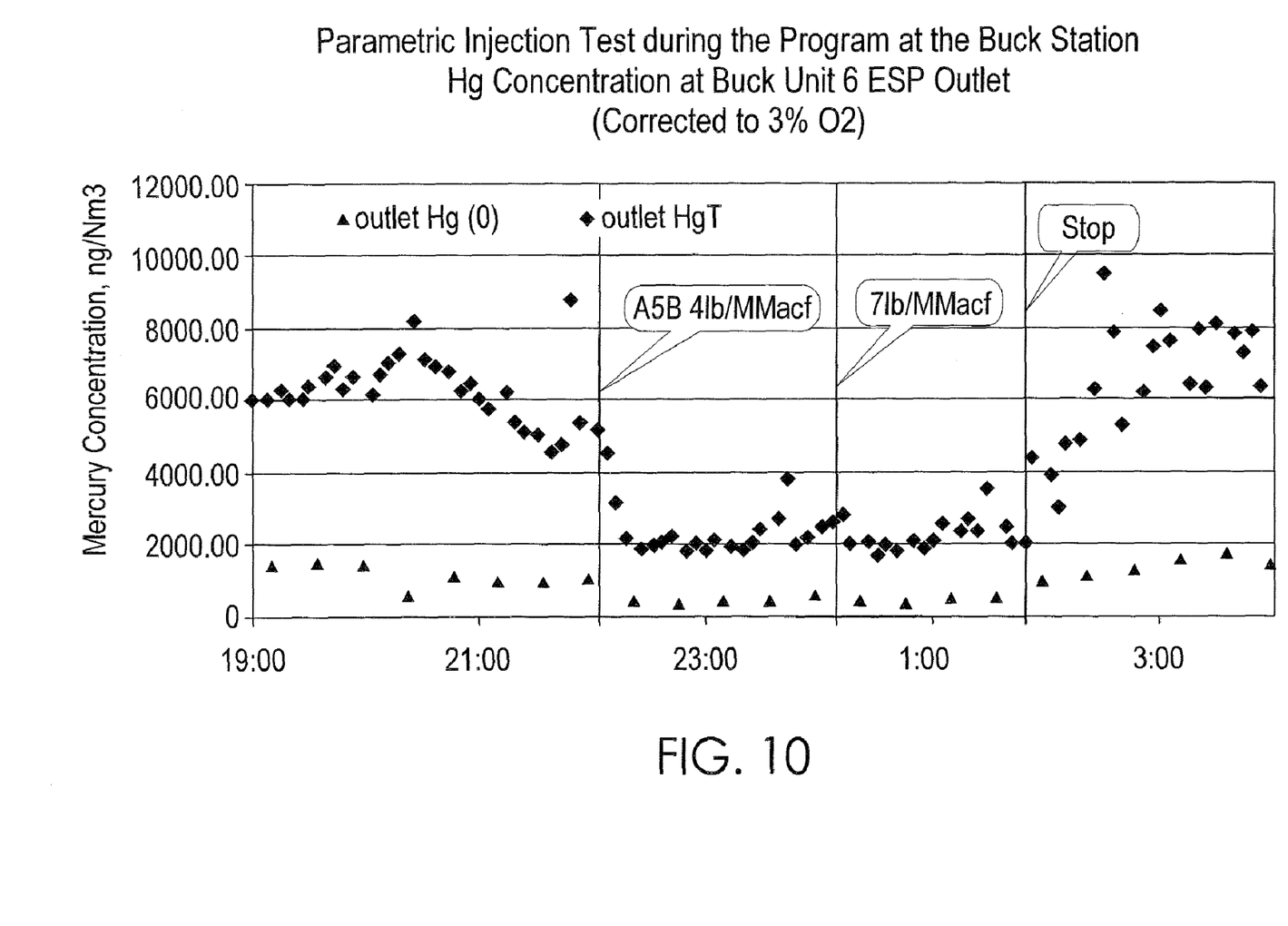
FIG. 10 is a graph of stack mercury emissions during the injection of brominated PAC into a hot-side ESP operating at 360° C. (675° F.)

Such mercury removal performance was confirmed during testing at a second power plant's hot-side ESP at a higher temperature (360° C. (675° F.)) than previously demonstrated. See FIG. 10. On the plot, HgT is the total mercury concentration at the outlet; Hg(0) is the elemental mercury concentration. Injection of brominated PAC at a rate of about 4 pounds-per-million-actual-cubic-feet-of-flue-gas (lb/MMacf) decreased total mercury concentration from about 6000 $ng/Nm^3$ to about 2000 $ng/Nm^3$. The mercury concentration gradually returned to a level above 6000 $ng/Nm^3$ after cessation of sorbent injection.

Example 6

Figure 11:
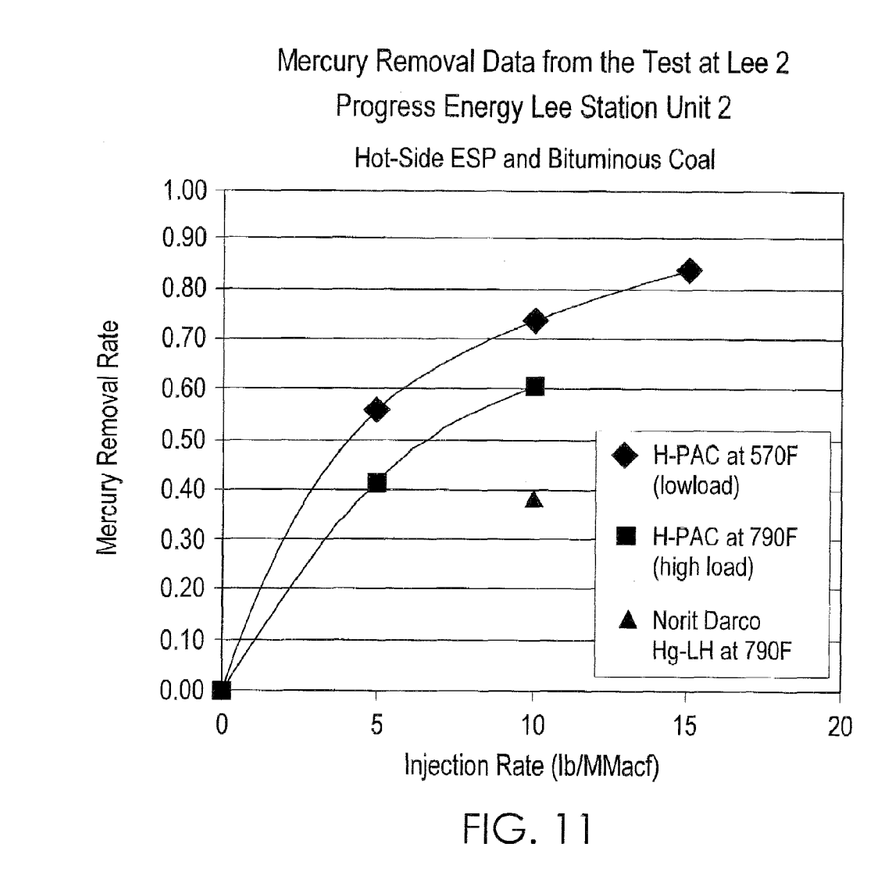
FIG. 11 is a graph of stack mercury emissions during the injection of brominated PAC into a hot-side ESP operating at 300° C. (570° F.) and 420° C. (790° F.)

The difference in the base carbon of the sorbents and their method of manufacture was demonstrated in the testing at a third plant. In these tests, a gas-phase brominated sorbent was tested at two temperatures, 300° C. (570° F.) and 420° C. (790° F.). See FIG. 11. The gas-phase brominated sorbent made from high rank coal (bituminous) and injected at a rate of 10 lb/MMacf had a net mercury removal rate of over 70% at the lower temperature and about 60% at the higher temperature.

A low-rank lignite-based salt-impregnated sorbent (Norit's DARCO Hg-LH) was also tested at this location. The performance of this sorbent provided a mercury removal rate below 40% at the same injection rate as the gas-phase brominated sorbent.

Example 7

The difference in performance of a gas-phase brominated PAC and a salt-impregnated PAC was again noted in testing at a fourth plant's hot-side ESP. The prior-noted plants burned bituminous coals, creating a flue gas chemistry high in sulfur dioxide and hydrogen chlorides. Importantly, this new plant burned subbituminous coal and generated a different flue gas chemistry. Yet the results were similar, indicating the general applicability of the invention. See FIG. 12.

Figure 12:
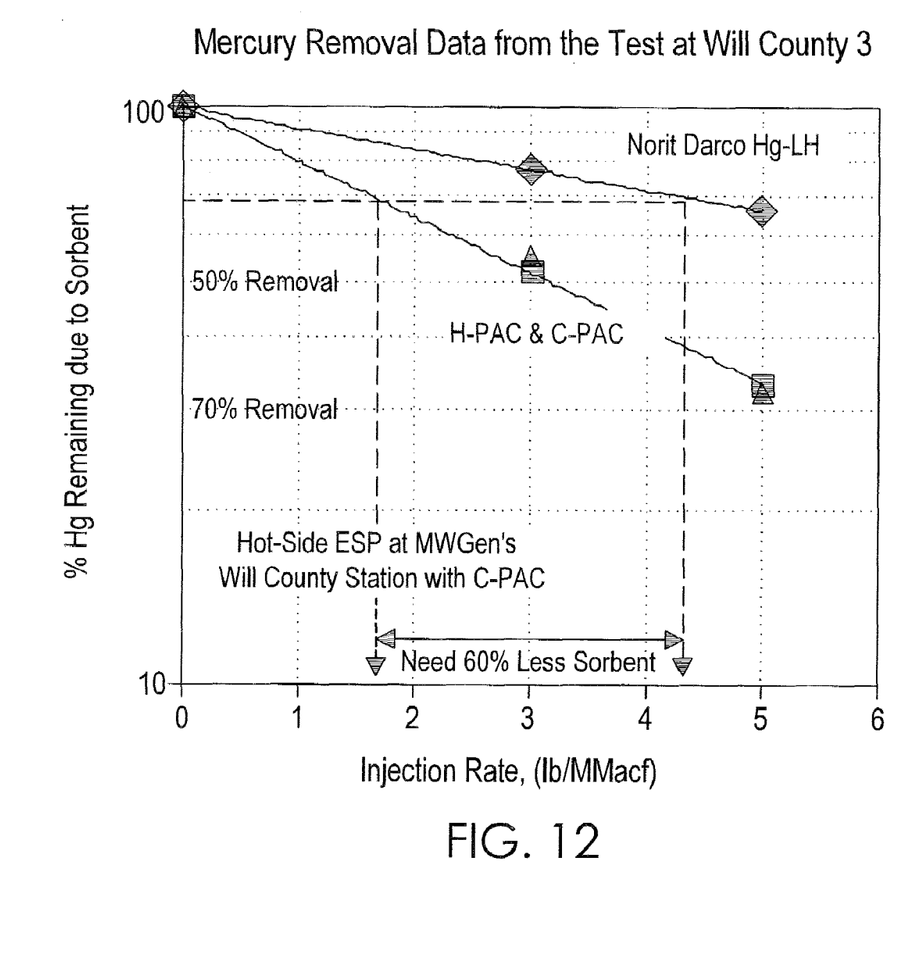
FIG. 12 is a graph of stack mercury emissions during the injection of gas-phase brominated PAC and a salt-impregnated PAC into a hot-side ESP operating at 370° C. (700° F.)

The gas-phase brominated PACs (designated as H-PAC and C-PAC) provided nearly 70% mercury removal at an injection rate of 5 lb/MMacf. The salt-impregnated, lignite-derived PAC (designated Norit DARCO Hg-LH) could only achieve a little more than 30% mercury removal at the same injection rate.

Figure 13:
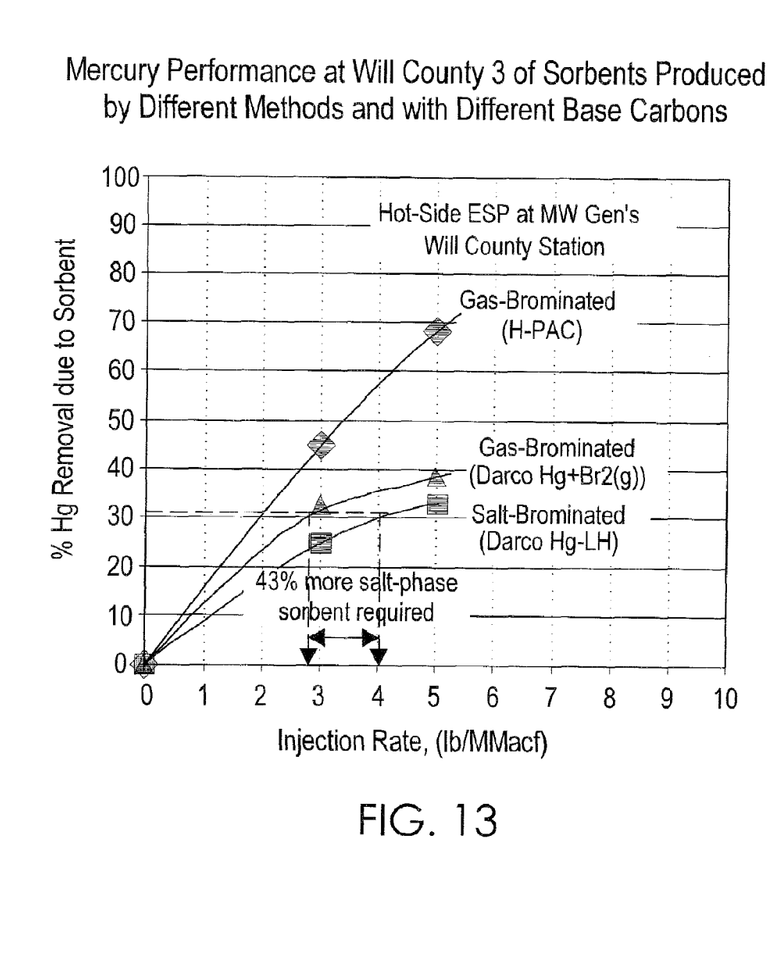
FIG. 13 is a graph of stack mercury emissions during the injection of gas-phase brominated PAC from different base carbons and salt-impregnated PAC into a hot-side ESP operating at 370° C. (700° F.).

An opportunity presented itself in this testing to evaluate the impact of the base carbon versus the method of bromination on mercury performance. The salt-impregnated PAC had a lignite base. This same base PAC was gas-phase brominated with bromine gas and tested at this facility. See FIG. 13. The gas-phase bromination of the lignite PAC did improve its mercury removal performance by over 40%, relative. However, an additive improvement in mercury performance came from using an anthracite PAC base.

While the present invention has been described in terms of one or more preferred embodiments, it is to be understood that other modifications may be made without departing from the scope of the invention, which is set forth in the claims below.

What is claimed is:

1. A method comprising:
   (a) injecting a plurality of chemically-treated carbonaceous mercury sorbent particles into a combustion gas stream such that at least a portion of any mercury or mercury-containing compounds in the gas stream are adsorbed onto at least a portion of the carbonaceous mercury sorbent particles, wherein the carbonaceous mercury sorbent particles comprise activated carbons produced from anthracite, bituminous coal, lignite, coconut shell, wood or wood waste;
   (b) collecting a portion of the carbonaceous mercury sorbent particles from the combustion gas stream on at least one collection plate of a hot-side electrostatic precipitator while the combustion gas stream passes through the hot-side electrostatic precipitator at least about 230° C.;
   (c) periodically rapping the at least one collection plate to release a substantial portion of the collected carbonaceous mercury sorbent particles into at least one hopper; and
   (d) periodically emptying the at least one hopper,
   wherein the rapping and emptying are conducted at rates such that less than about 70% of the mercury adsorbed onto the collected carbonaceous mercury sorbent particles desorbs and reenters the combustion gas stream.

2. The method of claim 1 wherein the sorbent particles comprise a halogen or a halogen-containing compound.

3. The method of claim 1 wherein the sorbent particles comprise sulfur or a sulfur-containing compound.

4. The method of claim 2, wherein the halogen comprises elemental bromine gas.

5. The method of claim 2, wherein the halogen-containing compound comprises a bromine-containing salt.

6. A method comprising:
   (a) injecting a plurality of carbonaceous mercury sorbent particles into a combustion gas stream that is derived from a combustion fuel and combustion air, and adding a chemical substance to the combustion gas stream and/or to the combustion fuel and/or to the combustion air, such that at least a portion of any mercury or mercury-containing compounds in the gas stream are adsorbed onto at least a portion of the carbonaceous mercury sorbent particles, wherein the carbonaceous mercury sorbent particles comprise activated carbons produced from anthracite, bituminous coal, lignite, coconut shell, wood or wood waste, and wherein said chemical substance is useful for increasing the mercury-adsorbing capability of the carbonaceous mercury sorbent particles;
   (b) collecting a portion of the carbonaceous mercury sorbent particles from the combustion gas stream on at least one collection plate of a hot-side electrostatic precipitator while the combustion gas stream passes through the hot-side electrostatic precipitator at least about 230° C.;
   (c) periodically rapping the at least one collection plate to release a substantial portion of the collected carbonaceous mercury sorbent particles into at least one hopper; and
   (d) periodically emptying the at least one hopper,
   wherein the rapping and emptying are conducted at rates such that less than about 70% of the mercury adsorbed onto the collected carbonaceous mercury sorbent particles desorbs and reenters the combustion gas stream.

7. A method comprising:
   (a) injecting a plurality of carbonaceous mercury sorbent particles into a combustion gas stream that is derived from a combustion fuel and combustion air, and adding a chemical substance to the combustion gas stream and/or to the combustion fuel and/or to the combustion air, such that at least a portion of any mercury or mercury-containing compounds in the gas stream are adsorbed onto at least a portion of the carbonaceous mercury sorbent particles, wherein the carbonaceous mercury sorbent particles comprise activated carbons produced from anthracite, bituminous coal, lignite, coconut shell, wood or wood waste, and wherein said chemical substance comprises a halogen or a halogen-containing compound;
   (b) collecting a portion of the carbonaceous mercury sorbent particles from the combustion gas stream on at least one collection plate of a hot-side electrostatic precipitator while the combustion gas stream passes through the hot-side electrostatic precipitator at least about 230° C.;
   (c) periodically rapping the at least one collection plate to release a substantial portion of the collected carbonaceous mercury sorbent particles into at least one hopper; and
   (d) periodically emptying the at least one hopper,
   wherein the rapping and emptying are conducted at rates such that less than about 70% of the mercury adsorbed onto the collected carbonaceous mercury sorbent particles desorbs and reenters the combustion gas stream.

8. A method comprising:
   (a) injecting a plurality of carbonaceous mercury sorbent particles into a combustion gas stream such that at least a portion of any mercury or mercury-containing compounds in the gas stream are adsorbed onto at least a portion of the carbonaceous mercury sorbent particles, wherein the carbonaceous mercury sorbent particles comprise activated carbons produced from anthracite, bituminous coal, lignite, coconut shell, wood or wood waste, and wherein at least a portion of said carbonaceous mercury sorbent particles have been formed by treatment of a carbonaceous substrate with a bromine or a bromine-containing compound;
   (b) collecting a portion of the carbonaceous mercury sorbent particles from the combustion gas stream on at least one collection plate of a hot-side electrostatic precipitator while the combustion gas stream passes through the hot-side electrostatic precipitator at least about 230° C.;
   (c) periodically rapping the at least one collection plate to release a substantial portion of the collected carbonaceous mercury sorbent particles into at least one hopper and emptying the at least one hopper at a sufficient rate such that less than about 70% of the mercury adsorbed onto the collected carbonaceous mercury sorbent particles desorbs and reenters the combustion gas stream.

9. A method for removing mercury and mercury-containing compounds from a combustion gas in an exhaust gas system with a hot-side electrostatic precipitator, comprising the steps of:

provproviding a carbonaceous substrate that has been derived from anthracite or bituminous coal;

treating the carbonaceous substrate with an effective amount of bromine or bromine containing salt for a sufficient time to increase the ability of the carbonaceous substrate to adsorb mercury and mercury-containing compounds;

injecting the carbonaceous substrate into a stream of the mercury-containing combustion gas for a sufficient time to allow an effective amount of the mercury and mercury-containing compounds in the combustion gas to attach onto the carbonaceous substrate;

electrostatically separating the carbonaceous substrate from the combustion gas stream on the collection plates of a hot-side electrostatic precipitator at a temperature of 230° C. (450° F.) or higher;

periodically rapping the collection plates to release the mercury-containing carbonaceous substrate into hoppers below; and emptying the hoppers at a sufficient rate such that less than about 70% of the mercury adsorbed onto the collected carbonaceous substrate desorbs and reenters the combustion gas stream.

* * * * *